(12) United States Patent
Donne

(10) Patent No.: US 6,468,410 B1
(45) Date of Patent: Oct. 22, 2002

(54) METHOD FOR SYNTHESIS AND CHARACTERIZATION OF ELECTRODE MATERIALS

(75) Inventor: Scott W. Donne, Redhead (AU)

(73) Assignee: Eveready Battery Company, Inc., St. Louis, MO (US)

(*) Notice: Subject to any disclaimer, the term of this patent is extended or adjusted under 35 U.S.C. 154(b) by 0 days.

(21) Appl. No.: 09/573,817

(22) Filed: May 17, 2000

Related U.S. Application Data

(60) Provisional application No. 60/139,027, filed on Jun. 14, 1999.

(51) Int. Cl.⁷ .......................... C25D 21/12; C10G 32/02
(52) U.S. Cl. .................... 205/81; 204/556; 204/267; 204/286
(58) Field of Search ................. 204/267, 269, 204/284, 292, 556, 286; 205/81

(56) References Cited

U.S. PATENT DOCUMENTS

| | | | |
|---|---|---|---|
| 3,132,080 A | * 10/1960 | Cann ........................... 205/81 |
| 4,216,279 A | 8/1980 | Mellors |
| 4,541,172 A | 9/1985 | Evans |
| 4,549,943 A | 10/1985 | Mellors |
| 5,169,736 A | 12/1992 | Bittihn et al. |
| 5,250,374 A | 10/1993 | Zhang |
| 5,558,961 A | 9/1996 | Doeff et al. |
| 5,628,887 A | * 5/1997 | Patterson et al. ........... 204/241 |
| 5,639,362 A | * 6/1997 | Van de Wynckel et al. 205/571 |
| 5,776,359 A | 7/1998 | Schultz et al. |

FOREIGN PATENT DOCUMENTS

| | | |
|---|---|---|
| DE | 3337568 | 4/1985 |
| DE | 3437377 | 4/1985 |
| JP | 61016473 | 7/1986 |
| WO | WO 9611878 | 4/1996 |
| WO | WO 9726683 | 7/1997 |
| WO | WO 9803521 | 1/1998 |
| WO | WO 9814641 | 4/1998 |
| WO | WO 9815501 | 4/1998 |
| WO | WO 9815805 | 4/1998 |
| WO | WO 9815813 | 4/1998 |
| WO | WO 9815969 | 4/1998 |
| WO | WO 9847613 | 10/1998 |
| WO | WO 9856796 | 12/1998 |
| WO | WO 9905154 | 2/1999 |
| WO | WO 9905318 | 2/1999 |
| WO | WO 9918431 | 4/1999 |
| WO | WO 9904247 | 11/1999 |

OTHER PUBLICATIONS

Sharma, M. M. et al. "Study To Enhance The Electrochemical Activity of Manganese Dioxide By Doping Technique," Journal of Power Sources 79 (1999) 69–74.

Jantscher, Wolfgang, "Synthesis, Characterization, and Application of Doped Electrolytic Manganese Dioxides", Journal of Power Sources 79 (1999) 9–18.

* cited by examiner

Primary Examiner—Nam Nguyen
Assistant Examiner—Thao Tran
(74) Attorney, Agent, or Firm—Russell H. Toye, Jr.

(57) ABSTRACT

An apparatus that is useful for evaluating and optimizing electrochemical processes and for electrochemically characterizing materials includes a base or substrate carrying a plurality of electrodes, at least one housing member that is secured to the base or substrate to define an electrochemical cell volume for holding an electrolyte in contact with the plurality of electrodes carried on the base, and a counter electrode disposed in the cell volume. The apparatus may be used for rapidly evaluating various parameters that influence electrochemical deposition processes, electrolytic processes and electrochemical cell performance.

33 Claims, 4 Drawing Sheets

METHOD FOR SYNTHESIS AND CHARACTERIZATION OF ELECTRODE MATERIALS

CROSS-REFERENCE TO RELATED APPLICATIONS

This application claims the benefit of U.S. Provisional Application No. 60/139,027, filed Jun. 14, 1999.

FIELD OF THE INVENTION

This invention relates to the field of preparing and testing materials used in electrochemical cells. More particularly, the invention relates to methods and apparatus for rapidly preparing electrodes and electrochemical cells, and evaluating electrochemical performance characteristics of electrode materials and/or electrolytes.

BACKGROUND OF THE INVENTION

Manufacturers of electrochemical cells routinely search for electrode materials and electrolytes which provide improved electrochemical performance characteristics. Typically, new materials are tested by incorporating the new materials in individual test cells, each of which comprises a housing into which electrodes are installed and electrolyte is added. Conventional methods for fabricating and testing new materials, such as electrode materials and electrolytes, in electrochemical test cells is relatively time consuming and expensive, and limits the ability of researchers to test a large array of different materials and/or examine electrochemical performance characteristics of electrolyte materials under various conditions and/or while varying parameters such as electrolyte composition, electrode composition, current density, etc.

Therefore, there is a need for methods and apparatus that allow more efficient preparation and testing of large arrays of electrochemical cells to evaluate electrochemical cell performance as a function of electrode composition, electrolyte composition, and/or as a function of various other parameters.

SUMMARY OF THE INVENTION

The invention is directed to novel apparatuses and methods for more rapidly, and at a reduced cost, preparing and testing a large number of electrode materials. The invention allows various electrochemical cell performance characteristics to be more quickly evaluated as a function of composition, concentration, and/or various other parameters.

In accordance with an aspect of this invention, there is provided an apparatus comprised of a base or substrate carrying a plurality of electrodes, and at least one housing member that is secured to the base or substrate to define a cell volume for holding an electrolyte in contact with one or more of the plurality of electrodes. A counter electrode is disposed in the cell volume.

In accordance with another aspect of the invention a process for electrochemically depositing a material on a plurality of separate electrodes is provided. The same material or different materials may be deposited on each of the electrodes. The process involves first preparing an electrochemical cell volume. This is achieved by the steps of providing a base carrying a plurality of electrodes, providing a housing member that is attachable to the base to define a cell volume for holding an electrolyte in contact with one or more of the electrodes carried on the base, and attaching the housing member to the base to provide a cell volume for holding an electrolyte in contact with one or more of the electrodes carried on the base. A counter electrode is positioned in the cell volume, and an electrolyte is dispensed into the cell volume so that the electrolyte contacts the counter electrode and at least one of the electrodes carried on the base to provide a medium for ion transport between the counter electrode and the at least one electrode carried on the base. Thereafter, deposition of a material on the at least one electrode is achieved by electrically connecting the at least one electrode carried on the base with the counter electrode through an electrical circuit, and inducing an electrical current to flow through the circuit to cause electrochemical deposition of a material on the at least one electrode carried on the base.

Another aspect of the invention pertains to a process for electrochemically characterizing a material. The process involves first preparing an electrochemical cell having a material that is to be electrochemically characterized on an electrode. In accordance with the invention, this is achieved by providing a base carrying a plurality of electrodes, providing a housing member that is attachable to the base to define a cell volume for holding an electrolyte in contact with one or more of the electrodes carried on the base, and attaching the housing member to the base to provide a cell volume for holding an electrolyte in contact with one or more of the electrodes carried on the base. A counter electrode is positioned in the cell volume, and an electrolyte is dispensed into the cell volume so that the electrolyte contacts the counter electrode and at least one of the electrodes carried on the base to provide a medium for ion transport between the counter electrode and the at least one electrode carried on the base. Thereafter, the deposited material is characterized by electrically connecting the at least one electrode carried on the base and carrying a deposited material with the counter electrode through an electrical circuit, and measuring an electrical response of the electrical circuit.

In accordance with another aspect of the invention, an apparatus is provided for forming a plurality of test electrodes. The apparatus includes a base, and a plurality of electrode holders affixed to the base. A working electrode is releasably affixed to each of the electrode holders. A working electrode housing is also affixed to each of the electrode holders. Each electrode holder together with the housing defines an electrolytic cell volume for containing a plating bath electrolyte. A counter electrode is disposed in each of the electrolytic cells. The apparatus can be used for electrolytic deposition of materials from a plating bath electrolyte onto the working electrode to form a plurality of test electrodes which may be subsequently used in an electrochemical cell to evaluate the electrochemical performance characteristics of the deposited materials as a function of composition, and/or to evaluate the electrochemical performance characteristics of a particular deposited electrode material as a function of various parameters, such as electrolyte composition.

Another aspect of the invention involves a method of preparing a plurality of test electrodes by depositing an electrode material on each of a plurality of working electrodes. The method involves providing a base having a plurality of electrode holders and affixing a working electrode to each of the electrode holders. A working electrode housing is affixed to each of the electrode holders. Each electrode holder together with the affixed housing and affixed working electrode define an electrolytic cell. A counter electrode is positioned in each of the electrolytic cells. A plating bath electrolyte is introduced into each of the electrolytic cells. Each plating bath electrolyte contains a material which is capable of being electrochemically deposited on the working electrode. Thereafter, an electrical potential is applied between the working electrode and the counter electrode of each electrolytic cell to electrolytically deposit electrode material onto the working electrode.

In accordance with another aspect of the invention, an apparatus for testing electrochemical cell materials is provided. The apparatus includes a base having a plurality of electrode holders. A test electrode is releasably affixed to each electrode holder, an a test apparatus housing is mounted on the base to define an electrochemical cell in which each of the test electrodes is located. A counter electrode is located in the electrochemical cell.

In accordance with a further aspect of the invention, a method of testing electrode materials is provided. The method involves providing a base having a plurality of electrode holders and affixing a test electrode to each of the electrode holders. A test apparatus housing is mounted on the base to define an electrochemical cell in which each of the test electrodes is located. A counter electrode is positioned in the electrochemical cell, and an electrolyte is introduced into the electrochemical cell. Performance characteristics of each of the test electrodes is evaluated by measuring characteristics of an electrical circuit connecting the counter electrode with each of the test electrodes.

DESCRIPTION OF THE PREFERRED EMBODIMENTS

Figure 1:
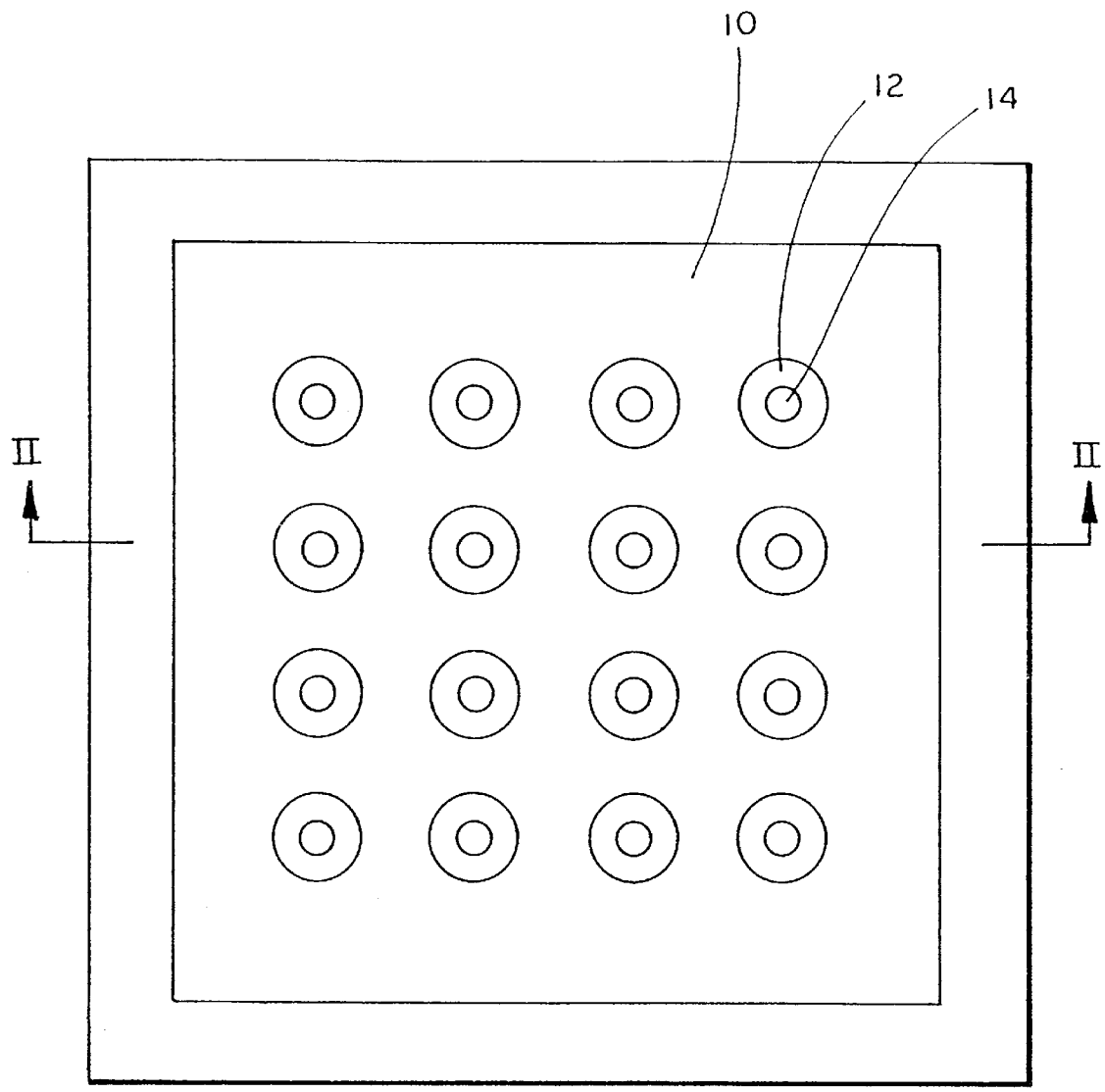
FIG. 1 is a top plan view of the base of an apparatus for forming and testing a plurality of electrodes.

In accordance with the general principles of this invention, an apparatus that is useful for evaluating and optimizing electrochemical processes and for electrochemically characterizing materials is comprised of a base or substrate carrying a plurality of electrodes, at least one housing member that is secured to the base or substrate to define a cell volume for holding an electrolyte in contact with one or more of the plurality of electrodes carried on the base or substrate; and a counter electrode disposed in the cell volume. The base and the housing member may together define an electrochemical cell volume, i.e., the base may itself serve as a cell wall, or the base may be mountable in the housing member. It is intended that the invention, as claimed, encompasses either of these alternatives. The apparatus may be used for rapidly evaluating various parameters that influence electrochemical deposition processes, electrolytic processes, and electrochemical cell performance. For example, the apparatus may be used for testing various electrode and/or electrolyte compositions to optimize electrochemical processes or to optimize selected electrochemical cell performance characteristics, e.g., discharge performance, capacity, etc. Other applications include testing to optimize operating parameters such as current density, operating temperature, and electrolyte composition for various electrochemical processes such as electro-refining processes, electro-winning processes, electro-purification processes, electroplating processes, and electrodeposition processes for making alloy catalysts (e.g., platinum/palladium alloys), etc.

The apparatus may be used in a process for electrochemically depositing a material on each of a plurality of electrodes, either to evaluate the influence of various parameters (e.g., electrolyte additives, concentration of various components in the electrolyte, current density, temperature, etc.) on the characteristics (e.g., deposition rate) of the deposition process or to evaluate the influence of such parameters on the characteristics of the deposited materials. Materials deposited on the plurality of electrodes may be removed (such as by scraping the deposits) from the electrodes and evaluated using various analytical instruments and techniques. Alternatively, the materials deposited on the electrodes may be evaluated while still on the surface of the electrodes, either within an electrochemical cell environment or while removed from the environment of the cell. For example, following deposition, the base can be separated from the apparatus to allow visual inspection of the deposits.

In accordance with a preferred aspect of the invention, an electrochemical testing apparatus is first used to deposit an array of materials on the plurality of electrodes carried by the base. Thereafter, an electrochemical testing apparatus comprising the base carrying a plurality of electrodes, each electrode having an electrochemically deposited material, is secured to one or more housing members, which may be the same or different from the housing member or housing members used to electrochemically deposit the array of materials on the plurality of electrodes. The base, with its carried electrodes and deposits, in combination with the one or more housing members, define one or more cell volumes in which an electrolyte and a counter electrode may be disposed. Using this arrangement, the electrochemical characteristics of each of the deposited materials can be evaluated, such as with chronoamperometry.

It is also contemplated that materials can be deposited on the plurality of electrodes carried on the base or substrate using deposition techniques other than electrochemical deposition and subsequently evaluated (i.e., electrochemically characterized) using the apparatus of this invention. For example, physical vapor deposition techniques such as sputtering or chemical vapor deposition techniques may be used for depositing a material on each of the plurality of electrodes. The base carrying the plurality of electrodes with material deposited on each of the electrodes is then secured to one or more housing members to define one or more cell volumes in which an electrolyte and a counter electrode are disposed. Thereafter, the materials may be electrochemically characterized using techniques such as chronoamperometry.

During deposition or testing, any number of individual cell volumes containing any number of individual electrodes carried by the base or substrate may be provided depending on the configuration of the housing member or members. Further, because each electrode carried on the base may be electrically connected to a different electrical circuit, it is possible to simultaneously electrochemically deposit material on any selected number of the plurality of electrodes supported on the base that are present in a particular cell volume. Thus, material may be electrochemically deposited on all of the electrodes carried on the base that are present in a particular cell volume simultaneously under identical conditions (e.g., identical electrolyte etc.), or sequentially under different conditions (e.g., different electrolyte different current density, etc.).

Similarly, after deposition (e.g., either electrochemical deposition or other deposition, such as chemical vapor deposition or physical vapor deposition), any number of individual cell volumes containing any number of individual electrodes carried by the base or substrate (each electrode having a deposit) may be provided. Each electrode carried on the base may be electrically connected to a different electrical circuit. This allows all of the deposits in a particular cell volume to be electrochemically characterized simultaneously under identical conditions, or sequentially under different conditions (e.g., different electrolytes, different temperature).

There is little advantage in having a plurality of electrodes carried on a single base or substrate if there is a one-to-one correspondence between the individual electrodes and the individual cell volumes defined by the base and housing members during electrochemical deposition, and if there is not any subsequent electrochemical characterization of the deposits. Likewise, there is little advantage in having a plurality of electrodes carried on a single base or substrate if there is a one-to-one correspondence between the individual electrodes and the individual cell volumes defined by the base and housing members during electrochemical characterization of deposits prepared by techniques that do not involve electrochemical deposition. There is also little advantage in having a plurality of electrodes carried on a single base or substrate if there is a one-to-one correspondence between the individual electrodes and the individual cell volumes defined by the base and housing members during both electrochemical deposition and electrochemical characterization of the deposits. However, the apparatuses and processes of this invention can very substantially reduce the time and effort needed to evaluate electrochemical processes and/or materials used in electrochemical processes, as a function of one or more parameters, when one or more of the electrodes carried on the base or substrate can be grouped together in the same cell volume during electrochemical deposition, and/or during electrochemical characterization. For example, the apparatus of the invention can be used to deposit identical materials under identical conditions on a plurality of electrodes carried on a base, and, thereafter, electrochemically characterize each of the deposits separately under different conditions with each deposit having a one-to-one correspondence with a cell volume during electrode characterization. It takes considerably less time and effort to prepare deposits on a plurality of electrodes located in a single cell than to prepare the same number of deposits separately in individual cells. Thus, the invention provides considerable benefits in those cases where a plurality of electrochemically deposited samples can be prepared on a corresponding plurality of electrodes residing in the same cell volume. While the benefits of the invention are perhaps greatest when all of the samples are electrochemically deposited simultaneously, there is still a very substantial benefit when the samples are deposited sequentially, since it requires considerably less time and effort to assemble a cell with a plurality of electrodes on which a material can be electrochemically deposited than to assemble a plurality of cells, each having a single electrode on which a material can be electrochemically deposited. An apparatus of this invention may also be advantageously employed to electrochemically characterize a plurality of deposits, each residing on a corresponding electrode carried on the base or substrate of the apparatus and located in the same cell volume, even when the deposits must be prepared in separate cell volumes or by methods other than electrochemical deposition. Electrochemical characterization tests are performed sequentially on each of the plurality of deposits. However, assembly of the apparatus followed by sequential testing of the individual deposits requires considerably less time and effort than assembling and testing a plurality of individual test cells, each having a single deposit.

During sequential deposition of deposits using the process and apparatus of this invention, process parameters may be changed between two consecutive electrochemical depositions. For example, the temperature, electrolyte composition, current density, etc. may be changed between two consecutive electrochemical depositions. Similarly, such process parameters may be changed between consecutive electrochemical characterization tests in a sequence of electrochemical characterization tests. In order to allow the electrolyte composition in a cell volume to be changed between consecutive depositions or consecutive electrochemical characterization tests in a sequence, the housing member defining a cell volume may be provided with an electrolyte inlet port and an electrolyte outlet port. Alternatively, the inlet port and/or outlet port may be provided in the base or substrate. In addition to being useful for changing electrolyte compositions between consecutive electrochemical depositions or electrochemical characterization tests in a sequence, the inlet and outlet ports may be used for maintaining a constant, or at least relatively constant, electrolyte composition during a deposition process or during an electrochemical characterization test.

Figure 2:
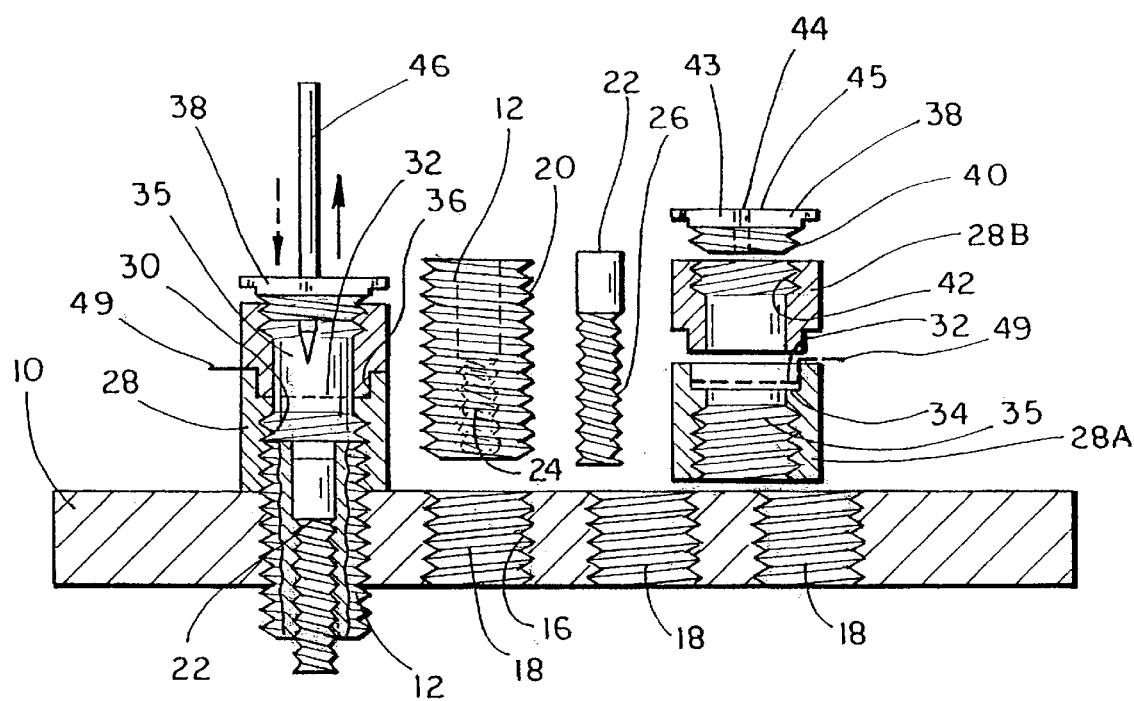
FIG. 2 is a schematic cross-sectional view along lines II—II of FIG. 1.
Figure 3:
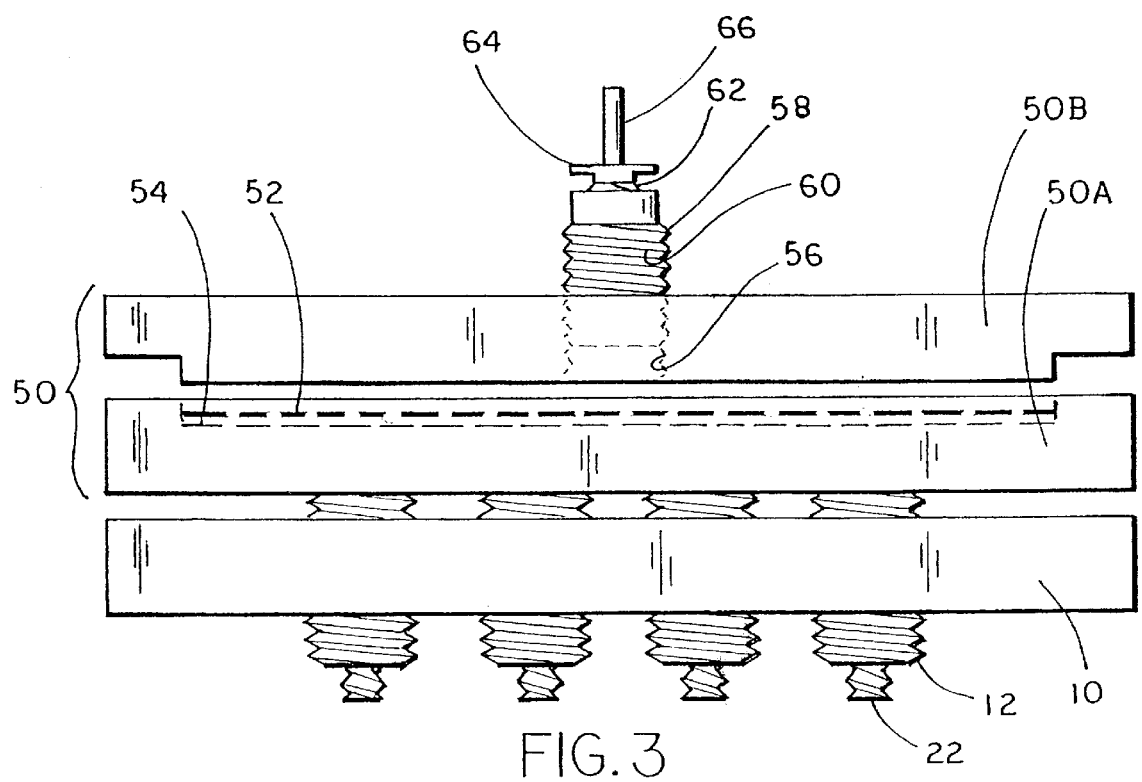
FIG. 3 is a schematic, elevational, cross-sectional view of an apparatus for testing electrochemical cell materials.

The electrodes carried on the base or substrate may be conveniently arranged in a rectangular array of rows and columns as shown in FIG. 1 or in any other convenient arrangement. Preferably, the base is a planar base as shown in FIGS. 2 and 3. The base shown in FIG. 1 is square but may be of any other convenient geometry, such a another type of polygon or a circle.

Other applications for the invention include evaluation of substrate electrodes. For example, the character of the electrodes on which a material is electrochemically deposited may influence process performance (e.g., deposition rate). In order to evaluate the effect of using different substrate electrodes, an apparatus in accordance with the invention can be prepared with a base or substrate carrying a plurality of electrodes made of different materials. Another application that is of particular interest to the inventors and assignee of this invention involves a determination of additives or dopants that can be incorporated into an electrolytic manganese dioxide (EMD) electrode to enhance performance characteristics. The apparatuses and processes of this invention may also be used for evaluating electro-organic synthesis processes. For certain high temperature processes, the base and housing member or housing members may be constructed of a ceramic material. The apparatus may also be used for optimizing multiple step electro-deposition processes such for thin film batteries wherein a first material is electrochemically deposited on a substrate electrode, followed by a separator which may be electrochemically deposited or deposited by another deposition technique, followed by deposition of a second electrode material. The deposition processes may be repeated to build additional layers as desired.

The apparatuses and methods of this invention are intended to improve the rate at which electrochemical cell materials can be prepared and tested. In accordance with certain embodiments of this invention, these objectives are achieved with reusable components which can be easily assembled and disassembled to form an array of electrolytic cells on a platform or base to facilitate preparation of an array of test electrodes by electrolytic deposition of a material on a working electrode in each of the electrolytic cells mounted on the platform or base. The individual electrolytic cells mounted on the base can be disassembled and removed, while the test electrodes formed during the electrolytic deposition process remain affixed to the platform for subsequent testing. Evaluation of the characteristics of the test electrodes is achieved by mounting a housing on the platform holding the test electrodes to define an electrochemical cell in which the test electrodes are located.

The invention will now be described in further detail with respect to the embodiments shown in the FIGS. 1–3. FIG. 1 is a top plan view of the base for an apparatus for forming a plurality of test electrodes and/or testing a plurality of electrode materials. Affixed to base 10 is a plurality of electrode holders 12, and test electrodes 14. Illustrated base 10 is designed to serve as a support or platform for sixteen electrolytic cells, and/or to support sixteen different test electrodes 14 in an electrochemical cell for evaluating the performance characteristics of the test electrodes. However, base 10 can be designed to support fewer or more electrolytic cells and/or test electrodes.

As shown in FIG. 2, electrode holders 12 of the illustrated embodiment are releasably affixed to base 10 by providing threads 16 on walls defining bores 18, and external threads 20 on electrode holders 12. External threads 20 are configured to matingly or threadingly engage internal threads 16 in bore 18 so that electrode holders 12 can be affixed to base 10 by screwing holders 12 into bores 18 of base 10. An electrode holder 12 may be releasably affixed in each of the bores 18 of base 10. Base 10 and holders 12 are made of a non-conducting or dielectric material, such as an electrically insulating plastic material or ceramic material.

As an alternative, the electrode holders may be formed as a permanent feature of the base, such as by integrally forming the electrode holders during an injection molding process of the base.

Affixed to the electrode holders are working electrodes 22. In the illustrated embodiment, working electrode 22 is releasably affixed to electrode holder 12 by providing electrode holder 12 with an internally threaded bore 24, and by providing working electrode 22 with external threads 26 which are configured to mate or threadingly engage with internal threads of bore 24. Working electrode 22 is releasably affixed to electrode holder 12 by screwing working electrode 22 into bore 24. Working electrode 22 is made of an electrically conductive material. A suitable material for electrode 22 when depositing EMD on the electrode is titanium. Other materials, such as a carbon electrode, may be used for working electrode 22.

Working electrode 22 and electrode holder 12 are designed to allow working electrode 22 to be counter-sunk into the top surface of electrode holder 12, i.e., electrode 22 may be screwed into electrode holder 12 so that the top surface of electrode 22 is below the top of electrode holder 12. This will ensure that a predetermined electrode area equal to the area of the upper surface of working electrode 22 is exposed to an electrolysis bath during deposition of a material on the top surface of working electrode 22. Electrode holder 12 is screwed into base 10 so that a portion of the thread 20 remains above the top of base 10. This allows a working electrode housing 28 to be releasably affixed to electrode holder 12 by providing housing 28 with internal threads 30 which matingly or threadingly engage external threads 20 of electrode holder 12. A counter electrode 32 may then be inserted into a lower portion 28A of working electrode housing 28. In the illustrated embodiment, counter electrode 32 is positioned on an inner ledge 34 defined near the top of lower housing portion 28A. Counter electrode 32 in the illustrated embodiment is a mesh electrode, such as a platinum mesh electrode, which allows plating bath electrolyte to flow freely through the counter electrode.

Working electrode housing 28 includes an upper portion 28B which is releasably affixed to lower housing portion 28A. Upper housing portion 28B and lower housing portion 28A are configured to provide a tight interference fit between upper and lower portions 28B and 28A so that plating bath electrolyte will not leak from the electrolytic cell volume 34 through joint 36. A resilient sealing ring may be provided at joint 36 to further reduce or eliminate any possibility of leakage of the electrolyte. Housing portions 28A and 28B may be made of plastic, although other materials may be used. A cell lid 38 which can be screwed tightly into upper portion 28B of housing 28, by means of external threads 40 of lid 38 which matingly or threadingly engage internal threads 42 of upper housing portion 28B, is provided to achieve a closed cell. Lid 38 includes bores 43 and 45 which may serve as an electrolyte inlet and an electrolyte outlet respectively, to allow circulation of plating bath electrolyte through cell volume 35 during electrolytic deposition of material from an electrolyte to the top surface of working electrode 22. A third bore 44 in lid 38 is provided for a reference electrode 46, such as a saturated calomel electrode ($Hg/Hg_2Cl_2$ in saturated KCl).

Working electrode housings 28 can be provided with a notch or groove (such as on either or both of the mating surfaces of portions 28A and 28B) to accommodate an electrical lead 49 from counter electrode 32.

Although it is conceivable that working electrode housing 28 can be a single piece rather than two portions 28A and 28B, the illustrated embodiment allows easy installation and replacement of counter electrode 32. It is also conceivable that working electrode housing 28 could be permanently affixed to base 10 and/or holder 12, such as by forming working electrode housing 28 as an integral part of base 10 and/or electrode holder 12. However, the illustrated embodiment allows easier installation and replacement of electrode 22, and releasable attachment of housing 28 to electrode holder 22 allows easy removal of working electrode housing 28 for subsequent testing of electrodes 22 while they are mounted on base 10.

After the electrolytic cells have been assembled, plating bath electrolyte may be circulated through the electrolytic cell. The electrolyte includes a material which is capable of being deposited on the top of working electrode 22 when an electrical current is supplied to the electrolytic cell. For example, manganese dioxide can be deposited on the top of working electrode 22 by passing an electrical current through the electrolytic cell while circulating a plating bath electrolyte comprising an acidic solution of a soluble manganese salt through the electrolytic cell. The plating bath electrolyte is continuously circulated through the electrolytic cell to ensure a constant electrolyte composition throughout deposition. Deposition can begin by using a potentiostat/galvanostat as the power supply. Deposition can be carried out using a pre-determined current density for a pre-determined period of time. When deposition is complete, distilled water may be circulated through the electrolytic cell to remove any residual electrolyte from the cell. This procedure can be repeated for each electrode in the array using different plating bath electrolyte compositions, temperatures and/or current densities, thus providing a wide variety of samples.

An array of test electrodes, which may or may not be prepared in the manner described above using the apparatus shown in FIGS. 1 and 2, may be tested with the apparatus shown in FIG. 3. However, an array of test electrodes prepared as described above using the apparatus of FIG. 2 can be very quickly and reliably tested on base 10, without removing electrodes 22 or electrode holders 12 from the base. Test electrodes 22 prepared using the apparatus shown in FIG. 2 are prepared for subsequent testing by removing working electrode housings 28 (unscrewing housing 28A from electrode holders 12, along with housing portions 28B, lids 38, and reference electrodes 46). Alternatively, test electrodes 22 can be prepared by alternative techniques and secured to base 10 by way of electrode holder 22. In either case, a test apparatus housing 50 is mounted on base 10 to define an electrochemical cell in which each of the test electrodes is located. In the illustrated embodiment, test apparatus housing 50 includes a spacing ring portion 50A, and a cell lid portion 50B. A counter electrode 52 is positioned on an inner ledge 54 defined near the top of spacer ring 50A. An electrical contact to the counter electrode 52 is made through spacer ring 50A and cell lid 50B. Base 10 and housing components 50A and 50B define an internal cell volume for a test cell electrolyte. Base 10, spacer ring 50A, and lid 50B are held firmly together, such as with clamps (not shown) or by securing bolts (not shown) around the edge of the components.

After the cell has been assembled, it may be filled with an electrolyte, such as an aqueous solution of about 9.0M KOH. A threaded bore 56 extends vertically through lid 50B, and an externally threaded reference electrode port 58 is screwed into threaded bore 56. Reference electrode port 58 includes a central bore 60 which provides a passageway from the top of holder 58 to the internal volume of the electrochemical cell defined by base 10 and housing 50. Upper portion 62 of bore 60 is threaded to matingly or threadingly engage an externally threaded portion of a lid 64 which holds reference electrode 66. Reference electrode 66 may for example be a Hg/HgO electrode.

After the electrochemical test cell shown in FIG. 3 has been assembled and a test cell electrolyte has been introduced into the internal volume of the cell defined by base 10 and test apparatus housing 50, the electrochemical performance of each test electrode 14 can be tested by measuring characteristics of an electrochemical cell comprising test electrode 14, counter electrode 52 and reference electrode 66. Such tests include potential step experiments and fast scan rate linear sweep voltammetry experiments.

The base 10, electrode holders 12, housings 28, 50, and lids 38, 64, can be made of a non-conductive or dielectric material which is resistant to corrosion or deterioration when it is in contact with plating baths or test electrolytes. Plastics, such as Teflon® (polytetrafluoroethylene), are suitable. Ceramic materials, for example, may be used for high temperature applications. The working electrodes 22, and counter electrodes 32, 52 should be made of a material that is stable under the conditions which the test electrodes are subjected during deposition and/or electrochemical characterization.

The working electrodes and counter electrodes are electrically conductive. Examples of suitable electrode materials include titanium, copper, noble metals such as platinum and gold, etc. Stainless steel can be used in the test apparatus for certain applications. Examples of preferred electrode materials include noble metals and carbon. Reference electrodes may be any suitable known reference electrode which is stable under the conditions of use and which can be adapted to the apparatuses.

The apparatuses shown in FIGS. 2 and 3, and the methods generally described above can be used for evaluating electrode materials deposited on working electrodes 22. For example, an array of electrode materials comprising doped manganese dioxide, having different dopants and different dopant concentrations may be tested to identify particular doped manganese dioxide materials exhibiting desirable electrochemical performance characteristics.

The apparatuses of this invention can be used for preparing and testing metal oxides other than manganese oxide. Examples include metal oxides doped with other elements, which can be made by adding salts of the desired dopant materials to the plating bath electrolyte.

If there are more bores 18 in the base 10 than are needed, the unneeded bores 18 can be plugged, such as with a threaded plug.

To make a plurality of identical test electrodes, the apparatus shown in FIG. 3 comprising a single housing, a single counter electrode, and test electrodes, can be used.

The apparatus for making test electrodes (shown in FIG. 2) can also be used to test electrodes. This would allow simultaneous testing of electrodes with different electrolytes and/or the use of different electrochemical tests for individual test electrodes.

The size of base 10, electrodes 22, working electrode housings 28, and test apparatus housing 50 can be selected based on test objectives. However, miniaturized test cells are preferred, with the typical internal cell volume defined by working electrode housing 28 being from less than 1 cubic centimeter to over 1,000 cubic centimeters, typically from about 1 cubic centimeter to about 100 cubic centimeters, and more typically from about 1 cubic centimeter to about 10 cubic centimeters.

Particular embodiments of the invention are described in the examples that follow. These examples are illustrative of the invention, but do not limit the invention.

EXAMPLES

A series of experiments were conducted in an array format to investigate three of the four basic parameters that influence electrolytic manganese dioxide (EMD) synthesis. The effects of current density, manganese sulfate concentration and sulfuric acid concentration were evaluated. A fourth parameter that strongly influences the synthesis of electrolytic manganese dioxide is temperature. However, temperature was held constant throughout the experiments, and, therefore, was not evaluated.

Preparation of Base

For these experiments, the base or substrate was a quartz disk (about 0.1 centimeter thick). A plurality of electrodes were provided on the base or substrate by employing physical deposition processes and photolithographic processes of the type that are commonly employed in the fabrication of electronic devices from semi-conductor materials. More specifically, the electrodes were prepared by first spin-coating a layer of a photoresist material onto a flat surface of the quartz disk. The thickness of the photoresist layer was about 3 to 5 microns. Selected areas of the photoresist layer were exposed to ultraviolet radiation through a mask. The areas of the mask that were opaque to the ultraviolet radiation corresponded with the locations on the quartz base or substrate where the electrodes and electrically conductive paths were to be located. The areas of the photoresist layer that were exposed to ultraviolet radiation were cured and remained in place on the quartz base or substrate upon contacting the substrate with a developer solvent, whereas the areas of the photoresist layer that were not exposed to ultraviolet radiation were easily removed upon contact with the developer solvent. Following development, the base was dried, and a very thin layer (about 100 Å) of titanium was deposited over the surface of the base on which the exposed and developed photoresist was deposited. The titanium deposition was achieved using radio frequency sputtering. The entire area of the base was covered by the titanium layer. After the titanium layer was deposited, the base was ultrasonicated in acetone. This treatment caused the previously exposed photoresist material to dissolve. As a result, all of the titanium that covered the exposed photoresist material was removed, leaving only the titanium that was sputtered directly onto the base. An array of 64 titanium electrodes, each about 1 millimeter in diameter was formed on the substrate. To protect the conductors on the surface of the quartz base and to limit deposition to a predetermined area on each of the electrodes, a photoresist material was deposited over the surface of the base on which the electrodes were deposited, exposed to ultraviolet radiation through a mask, and developed to provide a protective barrier over the conductors and edges of the electrodes.

EMD Deposition

The prepared base carrying 64 titanium electrodes of equal surface area was attached to a housing member which together with a base defined an electrochemical cell volume. The base was mounted on a heating apparatus to precisely control the temperature at the electrodes. A platinum counter electrode was positioned in the cell volume, and electrolyte was added either manually or through the use of an automated pumping system. The automated pumping system consisted of five electrolyte injection tubes and one electrolyte removal tube. Using the five injection tubes, electrolytes with a variety of different compositions were prepared in the electrochemical cell volume. This was achieved by the addition of each electrolyte component through an individual injection tube, i.e., $MnSO_4$, $H_2SO_4$, dopant solutions, and water were added through different injection tubes as required. Thorough mixing of the electrolyte was achieved through the use of an argon gas dispersion tube. After the appropriate electrolyte had been prepared in the electrochemical cell, the heating apparatus was turned on and the electrolyte was allowed to heat up to a desired temperature. The deposition current to each of the 64 electrodes was controlled with a 64 channel potentiostat/galvanostat. Each electrode in the array was connected to a separate working electrode from the array. The counter and reference electrode connections from each channel were connected to the platinum counter electrode in the cell, making it common for each electrode. Cell voltage versus time data was recorded for each electrode in the array. The electrolyte in the cell was changed by using the automated pumping system. At the conclusion of each deposition (which may involve one or more of the electrodes), the electrolyte was pumped out through the electrolyte removal tube, and water was pumped into the cell to rinse the electrode and cell. The rinse water was pumped out using the electrolyte removal tube. After three rinsing steps, the new electrolyte was added to the cell. After electrolytic manganese dioxide (EMD) had been deposited on each of the electrodes in the array, the heating apparatus was turned off, and the cell was rinsed thoroughly with water. Once cleaned, the electrode array was removed from the cell and dried in air at 100° C.

EMD Discharge

Each of the deposited electrodes was electrochemically characterized using chronoamperometry. Chronoamperometry was selected because it is a relatively fast experiment that provides high rate discharge data for each of the EMD samples. A fast characterization technique is desirable to allow a rapid throughput of samples. Chronoamperometry, to some extent, also provides capacity utilization information through the total amount of capacity passed in a set period of time. The shape of the current response curve can also be used to evaluate the mechanical properties of the EMD.

The electrochemical cell used to carry out the electrochemical discharge was almost identical to that used to synthesize the EMD. The electrode array was surrounded by cells walls defined by a housing member. A sufficient quantity of electrolyte (9.0 M KOH) was added to the cell volume. A platinum counter electrode was immersed in the electrolyte, as was a Hg/HgO (9.0 M KOH) reference electrode. Electrical connections were then made between the working electrode from each channel from the potentiostat and each EMD electrode in the array. A platinum mesh counter electrode was connected to the counter electrode from each channel of the potentiostat, making it common for each electrode. The Hg/HgO reference electrode was treated similarly, except it was connected to each reference electrode channel from the potentiostat. The discharge experiments were performed at ambient temperature.

Analysis

EMD deposits were characterized by average plating voltage and chronoamperometry, which provided information on open circuit voltage, rate capability, and capacity utilization. Rate capability was assessed from the slope of a current versus $t^{-\frac{1}{2}}$ plot, and capacity utilization was determined by a direct comparison between the amount of available capacity and the capacity realized during the chronoamperometry experiments.

The data was analyzed using a least squares regression technique that minimizes the difference between the experimental data and an equation having the form:

$$\text{Results}=a_0+a_1X+a_2Y+a_3Z+a_4XY+a_5XZ+a_6YZ$$

where Results is the data series that is being investigated, X is the $MnSO_4$ concentration, Y is the $H_2SO_4$ concentration, Z is the deposition current density, and $a_0$–$a_6$ are the coefficients in the model. The model includes linear effects, as well as first order effects. It does not take into consideration any curvature in individual parameters. The open circuit voltage for each electrode is shown in Table 1, and the coefficients determined from the numerical model are shown in Table 2.

TABLE 1

[MnSO$_4$](gL$^{-1}$)  Open Circuit Voltage
[H$_2$SO$_4$](gL$^{-1}$)  (V vs Hg/HgO)
Current Density (A m$^{-2}$)

|   | A | B | C | D | E |
|---|---|---|---|---|---|
| 1 | 10.00  0.224 | 10.00  0.252 | 10.00  0.254 | 10.00  0.239 | 10.00  0.021 |
|   | 5.00 | 16.25 | 27.50 | 38.75 | 50.00 |
|   | 100.00 | 81.25 | 62.50 | 43.75 | 25.00 |
| 2 | 32.50  0.209 | 32.50  0.234 | 32.50  0.224 | 32.50  0.242 | |
|   | 16.25 | 27.50 | 38.75 | 50.00 | |
|   | 100.00 | 81.25 | 62.50 | 43.75 | |
| 3 | 55.00  0.213 | 55.00  0.208 | 55.00  0.240 | | |
|   | 27.50 | 38.75 | 50.00 | | |
|   | 100.00 | 81.25 | 62.50 | | |
| 4 | 77.50  0.158 | 77.50  0.203 | | | |
|   | 38.75 | 50.00 | | | |
|   | 100.00 | 81.25 | | | |
| 5 | 100.00  0.193 | | | | |
|   | 50.00 | | | | |
|   | 100.00 | | | | |

TABLE 2

| Coefficient | Value |
|---|---|
| $a_0$ | 0.262 |
| $a_1$ | $3.60 \times 10^{-4}$ |
| $a_2$ | $-1.95 \times 10^{-3}$ |
| $a_3$ | $-1.76 \times 10^{-4}$ |
| $a_4$ | $1.27 \times 10^{-5}$ |
| $a_5$ | $-2.49 \times 10^{-5}$ |
| $a_6$ | $3.57 \times 10^{-5}$ |

Figure 4:
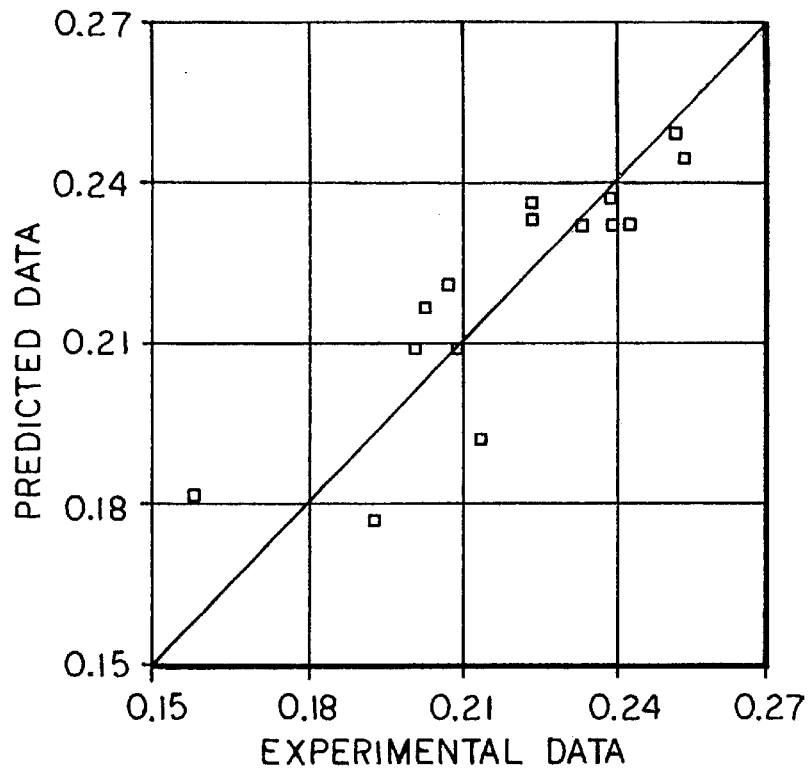
FIG. 4 is a graphical comparison between the experimental and predicted open circuit voltage.

A comparison between the experimental values and those predicted from the model for open circuit voltage is shown in FIG. 4.

Figure 5:
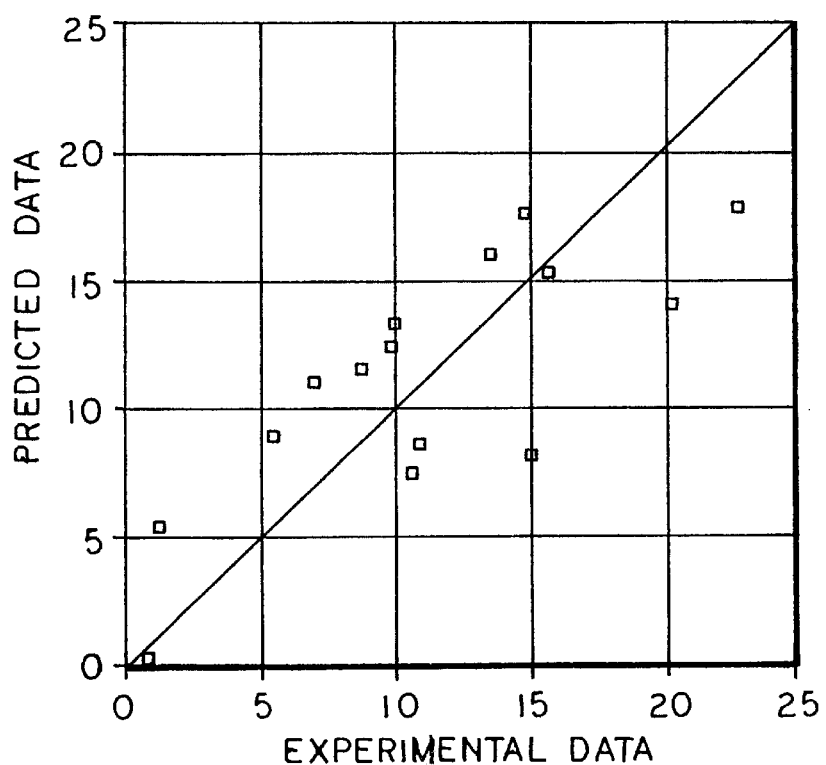
FIG. 5 is a graphical comparison between experimental and predicted rate capability.

A slope of current versus $t^{-\frac{1}{2}}$ for the discharge of each electrode is shown in Table 3. The numerical model coefficients for the slope of current versus $t^{-\frac{1}{2}}$ is shown in Table 4, and a comparison between the experimental and predicted rate capability data are shown in FIG. 5.

TABLE 3

[MnSO$_4$](gL$^{-1}$)  $10^6 \times$ Slope
[H$_2$SO$_4$](gL$^{-1}$)
Current Density (Am$^{-2}$)

|   | A | B | C | D | E |
|---|---|---|---|---|---|
| 1 | 10.00  0.779 | 10.00  10.982 | 10.00  14.947 | 10.00  15.727 | 10.00  10.016 |
|   | 5.00 | 16.25 | 27.50 | 38.75 | 50.00 |
|   | 100.00 | 81.25 | 62.50 | 43.75 | 25.00 |
| 2 | 32.50  1.209 | 32.50  8.886 | 32.50  22.906 | 32.50  22.248 | |
|   | 16.25 | 27.50 | 38.75 | 50.00 | |
|   | 100.00 | 81.25 | 62.50 | 43.75 | |
| 3 | 55.00  15.070 | 55.00  9.933 | 55.00  13.660 | | |
|   | 27.50 | 38.75 | 50.00 | | |
|   | 100.00 | 81.25 | 62.50 | | |
| 4 | 77.50  5.505 | 77.50  7.148 | | | |
|   | 38.75 | 50.00 | | | |
|   | 100.00 | 81.25 | | | |
| 5 | 100.00  10.662 | | | | |
|   | 50.00 | | | | |
|   | 100.00 | | | | |

TABLE 4

| Coefficient | Value |
|---|---|
| $a_0$ | 56.963 |
| $a_1$ | 0.490 |
| $a_2$ | $-0.823$ |
| $a_3$ | $-0.597$ |
| $a_4$ | $4.32 \times 10^{-3}$ |
| $a_5$ | $-1.68 \times 10^{-3}$ |
| $a_6$ | $8.14 \times 10^{-3}$ |

Figure 6:
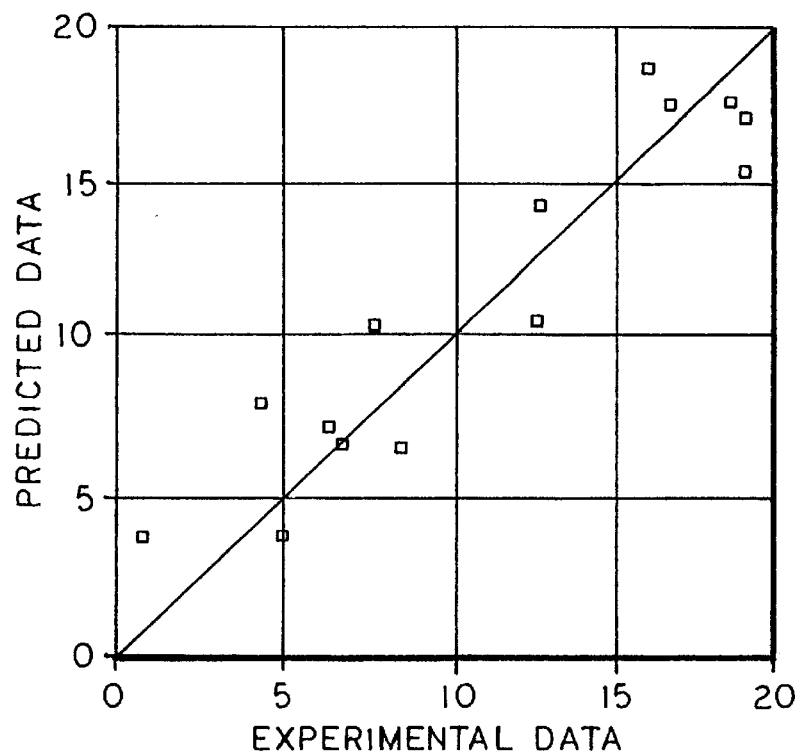
FIG. 6 is a graphical comparison between the experimental and predicted capacity utilization data.

Capacity utilization after 180 seconds for each of the EMD electrodes as a function of deposition condition is presented in Table 5. The numerical model coefficients for the capacity utilization data are presented in Table 6, and a graphical comparison between the experimental and predicted capacity utilization data is shown in FIG. 6.

TABLE 5

[MnSO₄](gL⁻¹)  
[H₂SO₄](gL⁻¹)  
Current Density (Am⁻²)

Capacity Utilization (%)

| | A | B | C | D | E |
|---|---|---|---|---|---|
| 1 | 10.00  0.20<br>5.00<br>100.00 | 10.00  6.33<br>16.25<br>81.25 | 10.00  16.82<br>27.50<br>62.50 | 10.00  18.71<br>38.75<br>43.75 | 10.00  16.11<br>50.00<br>25.00 |
| 2 | 32.50  0.62<br>16.25<br>100.00 | 32.50  7.75<br>27.50<br>81.25 | 32.50  19.13<br>38.75<br>62.50 | 32.50  19.04<br>50.00<br>43.75 | |
| 3 | 55.00  8.51<br>27.50<br>100.00 | 55.00  12.64<br>38.75<br>81.25 | 55.00  12.72<br>50.00<br>62.50 | | |
| 4 | 77.50  6.68<br>38.75<br>100.00 | 77.50  4.30<br>50.00<br>81.25 | | | |
| 5 | 100.00  4.98<br>50.00<br>100.00 | | | | |

TABLE 6

| Coefficient | Value |
|---|---|
| $a_0$ | 48.385 |
| $a_1$ | 0.335 |
| $a_2$ | −0.498 |
| $a_3$ | −0.539 |
| $a_4$ | −5.64 × 10⁻³ |
| $a_5$ | −3.64 × 10⁻⁴ |
| $a_6$ | 6.47 × 10⁻³ |

The average plating voltage was defined as the average voltage during the time period when the deposition current was on. The average plating voltage as a function of deposition conditions is shown in Table 7.

TABLE 7

[MnSO₄](gL⁻¹)  
[H₂SO₄](gL⁻¹)  
Current Density (Am⁻²)

Plating Voltage (V)

| | A | B | C | D | E |
|---|---|---|---|---|---|
| 1 | 10.00  1.142<br>5.00<br>100.00 | 10.00  0.953<br>16.25<br>81.25 | 10.00  0.860<br>27.50<br>62.50 | 10.00  0.844<br>38.75<br>43.75 | 10.00  0.803<br>50.00<br>25.00 |
| 2 | 32.50  1.028<br>16.25<br>100.00 | 32.50  0.903<br>27.50<br>81.25 | 32.50  0.937<br>38.75<br>62.50 | 32.50  0.907<br>50.00<br>43.75 | |
| 3 | 55.00  0.979<br>27.50<br>100.00 | 55.00  0.920<br>38.75<br>81.25 | 55.00  0.835<br>50.00<br>62.50 | | |
| 4 | 77.50  1.070<br>38.75<br>100.00 | 77.50  0.821<br>50.00<br>81.25 | | | |
| 5 | 100.00  0.904<br>50.00<br>100.00 | | | | |

TABLE 8

| Coefficient | Value |
|---|---|
| $a_0$ | 0.978 |
| $a_1$ | 2.98 × 10⁻³ |
| $a_2$ | −8.58 × 10⁻⁴ |
| $a_3$ | 1.36 × 10⁻³ |
| $a_4$ | −1.48 × 10⁻⁵ |
| $a_5$ | 2.37 × 10⁻⁵ |
| $a_6$ | −1.23 × 10⁻⁴ |

Figure 7:
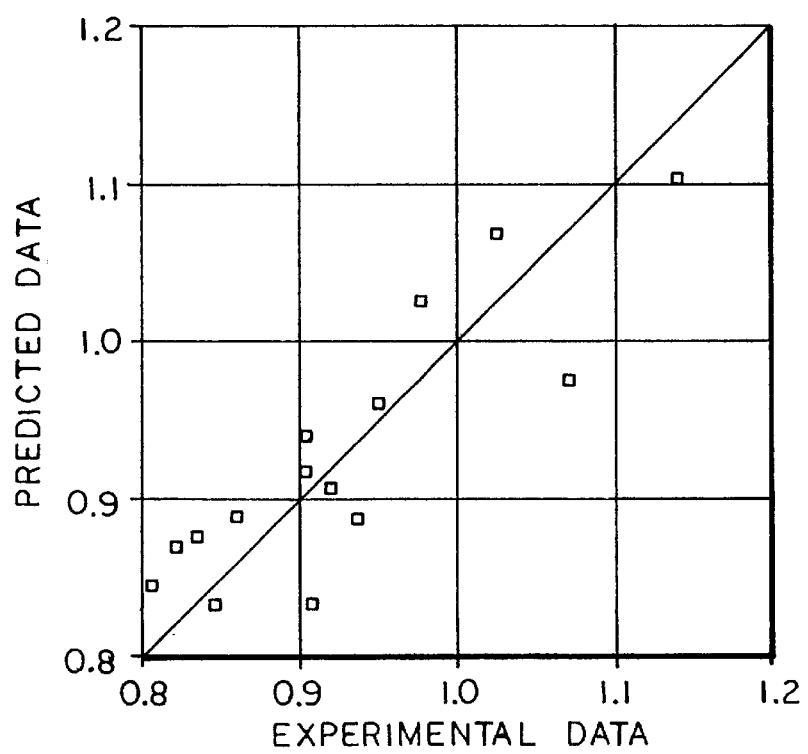
FIG. 7 is a graphical comparison between the experimental and predicted average plating voltage.

A comparison between the experimental and predicted average plating voltage is shown in FIG. 7.

From the above data, it was determined that increasing the manganese sulfate concentration and the plating current density resulted in increased average plating voltage. Conversely, increasing the sulfuric acid concentration resulted in a decrease in the average plating voltage. Interactions between manganese sulfate concentration and sulfuric acid concentration, and between sulfuric acid concentration and plating current density lead to a decrease in the average plating voltage. However, the interaction between the manganese sulfate concentration and the plating current density increases the average plating voltage. These results are generally consistent with our previous understanding of EMD deposition.

Changes in open circuit voltage with manganese sulfate concentration were negative. Despite the positive linear effect of manganese sulfate concentration, and the positive interaction between manganese sulfate concentration and sulfuric acid concentration, the change in open circuit voltage with manganese sulfate concentration was dominated by a strong negative interaction between manganese sulfate concentration and the plating current density. In general it was found that increasing the sulfuric concentration caused an increase in open circuit voltage, except at conditions including a low manganese concentration and a low plating current density. Interactions between sulfuric acid concentration and manganese sulfate concentration and between sulfuric concentration and plating current density were positive. It was found that changes in the EMD open circuit voltage depended on the synthesis conditions. In some instances, the open circuit voltage increase due primarily to a very strong positive interaction between the plating current density and the sulfuric acid concentration. This occurred despite the fact that the linear contribution to the changes in open circuit voltage were negative; i.e., the open circuit voltage had a linear decrease with increasing plating current density, and the interaction between plating current density and manganese sulfate concentration was also negative. In some instances the EMD open circuit voltage decreased with plating current density due primarily to the strong negative interaction with manganese sulfate concentration. These results are generally consistent with our current understanding of the effects of EMD deposition conditions on open circuit voltage.

It was determined that the effect of manganese sulfate concentration on EMD rate capability was positive, i.e., an increase in manganese sulfate concentration lead to an increase in EMD rate capability. The linear effect of manganese sulfate concentration was positive and significant compared to the interaction between manganese sulfate concentration and sulfuric acid concentration, and between manganese sulfate concentration and deposition current density, which were both negative. The negative interaction between manganese sulfate concentration and sulfuric acid concentration, and between the manganese sulfate concentration and the deposition current density increased as both sulfuric acid concentration and the deposition current density increased, suggesting that increases in the sulfuric acid concentration and current density detracts from rate capability. This becomes even more apparent when considering the effect that sulfuric acid concentration has on rate capability. Increasing the sulfuric acid concentration decreased EMD rate capability. This was due to a very strong negative linear effect and a negative interact between sulfuric acid concentration and manganese sulfate concentration. The interaction between sulfuric acid concentration and deposition current density was, however, positive, and in some cases, relatively significant, particularly at high current densities. The effect of deposition current density on END rate capability was negative. This was a result of a strong negative linear effect, as well as an interaction between deposition current density and manganese sulfate concentration. The positive interaction between deposition current density and sulfuric acid concentration was relatively significant, although not large enough to make a positive effect.

Manganese sulfate concentration had a positive effect on capacity utilization. This is despite the negative interaction that manganese sulfate concentration has with both sulfuric acid concentration and deposition current density. This result suggests that there is a strong linear correlation between manganese sulfate concentration and capacity utilization. The effect of sulfuric acid concentration on EMD capacity utilization is, for the most part, negative. This is the result of a strong linear effect and interaction effect between sulfuric acid concentration and manganese sulfate concentration. The exception to this occurs at low manganese sulfate concentration and high deposition current densities, wherein the effect of sulfuric acid concentration becomes positive. The effect of deposition current density on capacity utilization is also negative, primarily because of a strong negative linear effect. The interaction between deposition current density and manganese sulfate concentration is weakly negative. However, the interaction between deposition current density and sulfuric acid concentration is positive and can be significant at a high sulfuric acid concentration.

The experiments described in this example demonstrate that the apparatus and methods of this invention may be utilized to rapidly characterize and optimize electrochemical deposition processes, and the resulting deposits.

It will be apparent to those skilled in the art that various modifications and adaptations can be made to the present invention without departing from the spirit and scope of this invention. Thus, it is intended that the present invention cover the modifications and adaptations of this invention, provided they come within the scope of the appended claims and their equivalents.

What is claimed is:

1. A method of depositing and evaluating an electrode material on each of a plurality of working electrodes, comprising:
    providing a base having a plurality of electrode holders;
    affixing a working electrode to each of the electrode holders;
    affixing a housing to each of the electrode holders to define an electrolytic cell for containing an electrolyte;
    positioning a counter electrode in each electrolytic cell;
    introducing an electrolyte into each electrolytic cell, each electrolyte containing a material which is capable of being electrolytically deposited on the working electrode; and
    applying an electrical potential between the working electrode and the count electrode of each electrolytic cell to electrolytically deposit an electrode material onto the working electrode, wherein a first electrode material deposited on a first working electrode is different from a second electrode material deposited on a second working electrode; and
    evaluating performance characteristics of the electrode material on each working electrode by measuring characteristics of a plurality of electrical circuits comprising the working electrodes.

2. The method of claim 1, wherein each working electrode is releasably affixed to the electrode holder.

3. The method of claim 2 in which the working electrode is releasably affixed to the electrode holder by mating engagement between external threads on the working electrode and a threaded bore in the electrode holder.

4. The method of claim 1, wherein each electrode holder is releasably affixed to the base.

5. The method of claim 4 in which each electrode holder is releasably affixed to the base by engagement between external threads on the electrode holder and an internally threaded bore in the base.

6. The method of claim 1, wherein each working electrode is made of titanium.

7. The method of claim 1, wherein each counter electrode is a metal mesh electrode.

8. The method of claim 1, in which each counter electrode is a platinum mesh electrode.

9. The method of claim 1, wherein each housing comprises a lower portion and an upper portion releasably connected to the lower portion.

10. The method of claim 9, in which the upper portion of each housing is connected to the lower portion of each housing by an interference fit.

11. The method of claim 1, wherein each housing further comprises a lid releasably connected to the upper housing portion.

12. The method of claim 1, wherein a first electrolyte composition in a first cell is different from a second electrolyte composition in a second cell in at least one of depositing and evaluating the electrode materials.

13. The method of claim 1, wherein at least one of the plurality of electrode holders is removed after depositing the electrode material onto each of the working electrodes such that more than one working electrode is located within a single electrochemical cell during the evaluating.

14. The method of claim 13, wherein all of the working electrodes are located within a single electrochemical cell defined by a single housing during the evaluating.

15. The method of claim 13, wherein the evaluating comprises discharging the electrode material in at least one of the electrochemical cells, the electrode material in the at least one of the electrochemical cells comprises manganese dioxide, and during discharging the at least one of the electrochemical cells contains an aqueous alkaline electrolyte.

16. The method of claim 13, wherein a first electrolyte composition in a first cell is different from a second electrolyte composition in a second cell.

17. The method of claim 1, wherein evaluating comprises discharging the electrode material on at least one of the working electrodes.

18. The method of claim 1, wherein the electrode material comprises manganese dioxide.

19. The method of claim 18, wherein the electrode material further comprises another element.

20. The method of claim 18, wherein the evaluating comprises discharging the electrode material in at least one of the electrochemical cells and during discharging the at least one of the electrochemical cells contains an aqueous alkaline electrolyte.

21. A method of synthesizing and testing electrode materials comprising:

providing a base having a plurality of electrode holders affixed to the base;

affixing a working electrode to each of the electrode holders;

mounting a housing on the base to define an electrochemical cell in which each of the working electrodes is located;

positioning a counter erode in the electrochemical cell;

introducing an electrolyte into the electrochemical cell;

depositing an electrode material onto each of the working electrodes;

discharging the electrode material on at least one of the working electrodes; and evaluating performance characteristics each electrode materials by measuring characteristics of an electrical circuit connecting the counter electrode with each of the working electrodes.

22. The method of claim 21, wherein the working electrode is releasably affixed to the electrode holder by engagement between external threads on the working electrode and a threaded bore in the electrode holder.

23. The method of claim 21, wherein each electrode holder is releasably affixed to the base.

24. The method of claim 23, wherein the electrode holder is releasably affixed to the base by engagement between external threads on the electrode holder and a threaded bore in the base.

25. The method of claim 21, wherein the electrode material comprises manganese dioxide.

26. The method of claim 25, wherein the electrode material further comprises another element.

27. The method of claim 21, wherein the electrode material is deposited onto each of the working electrodes electrolytically.

28. The method of claim 21, wherein the electrode material is deposited onto each of the working electrodes by a non-electrolytic method.

29. The method of claim 21, wherein more than one of the working electrodes is located in the electrochemical cell.

30. The method of claim 29, wherein additional housings are mounted on the base after depositing the electrode material on each of the working electrodes.

31. The method of claim 30, wherein each of the housings defines an electrochemical cell.

32. The method of claim 31, wherein each of the electrochemical cells contains no more than one working electrode.

33. The method of claim 31, wherein an electrolyte is introduced into each electrochemical cell and a first electrolyte composition in a first cell is different from a second electrolyte composition in a second cell.

* * * * *